(12) United States Patent
Okuda

(10) Patent No.: US 6,462,155 B1
(45) Date of Patent: Oct. 8, 2002

(54) CATALYST FOR OLEFIN POLYMERIZATION AND PROCESS FOR PRODUCING OLEFIN POLYMER WITH THE CATALYST

(75) Inventor: Fumio Okuda, Ishihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/582,638

(22) PCT Filed: Dec. 2, 1999

(86) PCT No.: PCT/JP99/06768

§ 371 (c)(1),
(2), (4) Date: Aug. 3, 2000

(87) PCT Pub. No.: WO00/32643

PCT Pub. Date: Jun. 8, 2000

(30) Foreign Application Priority Data

Feb. 12, 1998 (JP) ............................................. 10-342458

(51) Int. Cl.[7] .................................................. C08F 4/42
(52) U.S. Cl. ........................ 526/161; 526/171; 526/172; 526/120; 526/348; 526/141; 502/155; 502/167
(58) Field of Search ................................. 326/161, 171, 326/172, 120, 348, 141; 502/155, 167

(56) References Cited

U.S. PATENT DOCUMENTS 5,714,556 A * 2/1998 Johnson et al. ............. 526/135

FOREIGN PATENT DOCUMENTS

| JP | 10-7712 | * | 1/1998 |
| JP | 2000-1512 | * | 1/2000 |
| JP | 2000-1513 | * | 1/2000 |
| WO | WO 98/27124 | * | 6/1998 |
| WO | WO 98/30612 | * | 7/1998 |

OTHER PUBLICATIONS

Horton et al., Organometallics, 15, 2672–2674 (1996).*

Small et al., J. Am. Chem. Soc., 120, 4049–4050 (1998).*

* cited by examiner

Primary Examiner—David W. Wu
Assistant Examiner—Ling-Siu Choi
(74) Attorney, Agent, or Firm—Oblon, Spivak, McClelland, Maier & Neustadt, P.C.

(57) ABSTRACT

The invention provides a catalyst comprising a transition metal compound which has a nitrogen-containing tridentate ligand and of which the transition metal is of Groups 8 to 10 of the Periodic Table, and an organoaluminium compound, the catalyst of the invention has high activity. In the method of using the catalyst for producing polyolefins, of which the advantages are that the catalysts do not require methylaluminoxane which is expensive and difficult to handle, and of which storage stability is poor, and is extremely dangerous. The invention realizes efficient production of polyolefins (especially polyethylene) on an industrial scale.

8 Claims, No Drawings

CATALYST FOR OLEFIN POLYMERIZATION AND PROCESS FOR PRODUCING OLEFIN POLYMER WITH THE CATALYST

TECHNICAL FIELD

The present invention relates to catalysts for olefin polymerization and to a method of using the catalysts for producing olefin polymers. More precisely, the invention relates to catalysts for olefin polymerization, with which polyolefins, especially polyethylenes are efficiently produced on an industrial scale, and relates to a method of using the catalysts for producing olefin polymers.

BACKGROUND ART

At present, Ziegler catalysts and metallocene catalysts are much used for olefin polymerization, and they comprise, as the essential catalyst component, a compound of a metal element belonging to Group 4 of the Periodic Table, such as titanium, zirconium, etc.

On the other hand, recently, novel catalyst systems that differ from the above have been developed, and they comprise a complex of a metal belonging to Groups 8 to 10 of the Periodic Table, such as typically nickel or palladium. Heretofore, nickel complexes have been known as oligomerization catalysts for olefins, but it has been said that they are unsuitable to polymer production.

Regarding the catalyst systems comprising such a nickel or palladium complex, some techniques have been proposed, including, for example, (1) a method of using a catalyst with an Ni (0) complex coordinated with an adduct of quinone and a tertiary phosphine for ethylene polymerization (Japanese Patent Publication No. 1796/1993); (2) a catalyst system comprising an Ni (0) complex, an adduct of maleic anhydride and a tertiary phosphine, a phosphorylide, and an organoaluminium compound (Japanese Patent Laid-Open No.; 203106/1986); (3) a catalyst system comprising an Ni(0) or Ni(II) complex and an iminophospholane compound (Japanese Patent Laid-Open No. 115311/1991); (4) a method of using a borate complex of a metal of Groups 8 to 10 (Fe, Co, Ni, Ru, Rh, Pd, Os, Ir, Pt) coordinated with a cis-type chelate ligand for ethylene polymerization (Japanese Patent Laid-Open No. 227608/1992); (5) a catalyst system comprising an Ni (0) complex, an adduct of an imide and a tertiary phosphine, and a phosphine oxide (Japanese Patent Laid-Open No. 122721/1994); (6) a catalyst system comprising a combination of a Pd(II):$BF_4^-$ complex and methylaluminoxane (Japanese Patent Laid-Open No. 82314/1995); (7) a catalyst system comprising an Ni (II) complex, an iminophospholane compound and an organoaluminium compound (Japanese Patent Laid-Open No. 277610/1991); (8) a catalyst system comprising an Ni(0) or Ni(II) complex and an iminophospholane compound having a bulky substituent (Japanese Patent Laid-Open No. 25932/1995); (9) a catalyst system comprising a combination of an Ni(II):phosphorus:oxygen chelate complex and a linear or cyclic aluminium compound (Japanese Patent Laid-Open No. 14217/1989), etc.

However, the ethylene polymerization method (1) is defective in that it requires an extremely high reaction pressure (for example, 100 kg/cm$^2$) and the catalyst activity to give polyethylene therein is extremely low (about 6 kg/g-Ni·hr). The catalyst system (2) is also defective in that it is for high-pressure ethylene reaction: and it is complicated as comprising many different components. In addition, its activity is extremely low (about 1 kg/g-Ni·hr or less). The catalyst system (3) could be effective even under low reaction pressure, but its activity is extremely low (about 1 kg/g-Ni·hr or less). In the ethylene polymerization method (4), the catalyst activity is extremely low (about 0.1 kg/g-Ni·hr or less). The activity of the catalyst system (5) is low (about 5 kg/g-Ni·hr). Though comprising a cationic complex, the catalyst system (6) requires expensive methylaluminoxane for expressing its activity. In addition,: its activity is low (about 3 kg/g-Ni·hr or less). The activity of the catalyst systems (7) and (8) is extremely low (about 5 kg/g-Ni·hr or less). The catalyst system (9) contains a linear or cyclic organoaluminoxane that serves as a promoter. However, the organoaluminoxane is produced through reaction of a trialkylaluminium or dialkylaluminiummonochloride with water, and only methylaluminoxane is described in the examples. No description relating to a low-molecular-weight linear or cyclic organoaluminiumoxy compound is given in the specification. In addition, the system requires expensive methylaluminoxane. Still another drawback of the system is that it requires high reaction pressure, correlating to its activity, but its activity is low (for example, about 20 kg/g-Ni·hr or less under a reaction pressure of 30 kg/cm$^2$G).

Recently, a catalyst system that comprises a combination of a complex of a metal of Groups 8 to 10, typically such as nickel or palladium, coordinated with a nitrogen-containing ligand such as a diimine or the like, and an organoaluminium compound such as methylaluminoxane (MAO) or the like, or comprises the nitrogen-containing ligand complex combined with an anion species of $BF_4^-$, $PF_6^-$, $SbF_6^-$ or $BAF^-$ [tetrakis(3,5-bistrifluoromethylphenyl)borate] has been disclosed (International Patent Laid-Open No. 96/23010). For example, disclosed is a catalyst system comprising a compound of a formula [1]:

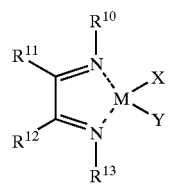

[1]

wherein: $R^{10}$ and $R^{13}$ each independently represent an aliphatic hydrocarbon group having from 1 to 20 carbon atoms, or an aromatic group having from 7 to 20 carbon atoms in total and having a hydrocarbon group on its ring; $R^{11}$ and $R^{12}$ each independently represent a hydrogen atom, or a hydrocarbon group having from 1 to 20 carbon atoms; $R^{11}$ and $R^{12}$ may be bonded to each other to form a ring; X and Y each independently represent a hydrogen atom, or a hydrocarbon group having from 1 to 20 carbon atoms; M represents a transition metal of Groups 8 to 10 of the Periodic Table.

The catalyst system has the advantage of extremely high activity in ethylene polymerization, as compared with the catalyst systems mentioned above, but can be used only at low temperatures. In addition, the molecular weight of the polymers produced with it is low. Therefore, the catalyst system is not as yet practicable.

Further recently, a catalyst system comprising a nitrogen-containing tridentate ligand complex with iron or cobalt has been disclosed (Brookhart et al., J. Am. Chem. Soc., 1998, 4049; Gibson et al., Chem. Commun., 1998, 849). For example, it includes a compound of a formula [2]:

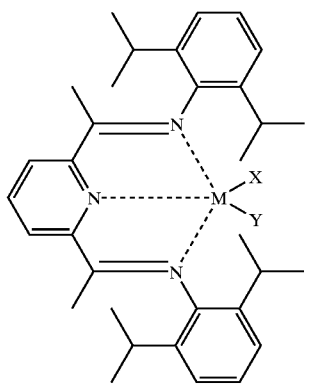

wherein X and Y each independently represent a hydrogen atom, a halogen atom, or a hydrocarbon group having from 1 to 20 carbon atoms; M represents a transition metal of Groups 8 to 10 of the Periodic Table.

The catalyst system has the advantage of extremely high activity in ethylene polymerization (about 400 kg/g-Ni·hr), as compared with the conventional Group 8 to 10 transition metal catalysts mentioned above. However, in order to fully express its activity, it requires a large amount of an aluminoxane, especially methylaluminoxane. Methylaluminoxane is expensive, and, in addition, it is difficult to handle, its storage stability is poor, and it is extremely dangerous. Aluminoxanes must be produced through reaction of a trialkylaluminium or dialkylaluminiummonochloride with water, and the reaction efficiency for producing them is low.

The present invention relates to catalysts for olefin polymerization and to a method of using the catalysts for producing olefin polymers. More precisely, its object is to provide catalysts for olefin polymerization and a method of using the catalysts for producing olefin polymers, of which the advantages are that the catalysts do not require methylaluminoxane which is expensive and difficult to handle, and of which storage stability is poor, and is extremely dangerous, and olefin polymers, especially polyethylenes are efficiently produced on an industrial scale.

DISCLOSURE OF THE INVENTION

We, the present inventors have assiduously studied so as to attain the object as above, and, as. a result, have found that the object can be attained by polymerizing olefins, especially ethylene, in the presence of a catalyst which comprises a transition metal compound of Groups 8 to 10 of the Periodic Table having a specific structure and an organoaluminium compound. On the basis of this finding, we have completed the present invention.

Specifically, the invention provides catalysts for olefin polymerization and a method of using the catalysts for producing olefin polymers.

1. A catalyst for olefin polymerization, comprising (A) a transition metal compound which has a nitrogen-containing tridentate ligand and of which the transition metal is of Groups 8 to 10 of the Periodic Table, (B) an organoaluminium compound.

2. The catalyst for olefin polymerization of above 1, in which the transition metal compound (A) is represented by the following general formula (I)

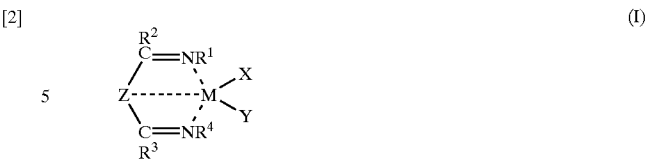

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, a halogen atom, or a hydrocarbon group having from 1 to 20 carbon atoms; Z represents a nitrogen-containing functional group.

3. The catalyst for olefin polymerization of above 2, in which Z in formula (I) is represented by the following general formula (II):

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

4. The catalyst for olefin polymerization of above 2, in which Z in formula (I) is represented by the following general formula (III):

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

5. The catalyst for olefin polymerization of any of above 1 to 4, in which the transition metal of Groups 8 to 10 of the Periodic Table is iron or cobalt.

6. The catalyst for olefin polymerization of any of above 1 to 5, in which the organoaluminium compound (B) is a trialkylaluminium compound.

7. A method for producing olefin polymers, which comprises polymerizing olefins in the presence of the catalyst for olefin polymerization of any of above 1 to 6.

8. The method for producing olefin polymers of above 7, in which the olefin is ethylene.

BEST MODES OF CARRYING OUT THE INVENTION

The invention is described below with reference to their embodiments.

As so mentioned above, the catalyst for olefin polymerization of this invention comprises (A) a transition metal compound which has a nitrogen-containing tridentate ligand and of which the transition metal is of Groups 8 to 10 of the Periodic Table, (B) an organoaluminium compound. In the method for producing olefin polymers of the invention, the olefin polymerization catalyst is used for polymerizing olefins.

The catalyst for olefin polymerization and the method for producing olefin polymers of the invention are described in detail hereinunder.

1 Catalyst for Olefin Polymerization
(1) Transition Metal Compound (A):

The transition metal compound (A) for use in the invention, which has a nitrogen-containing tridentate ligand and of which the transition metal is of Groups 8 to 10 of the Periodic Table, is not specifically defined, but is preferably represented by the following general formula (I):

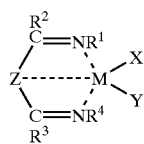

(I)

wherein M represents a transition metal of Group 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, a halogen atom or a hydrocarbon group having from 1 to 20 carbon atoms; Z represents a nitrogen-containing functional group.

M represents a transition metal of Groups 8 to 10 of the Periodic Table, concretely including Fe, Co, Ni, Ru, Rh, Pd, Os, Ir and Pt. Of these, preferred is Fe or Co.

$R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total. The hydrocarbon group having from 1 to 20 carbon atoms includes a linear hydrocarbon group having from 1 to 20 carbon atoms, a branched hydrocarbon group having from 3 to 20 carbon atoms, and a cycloaliphatic hydrocarbon group having from 3 to 20 carbon atoms. Concretely, it includes a methyl group, an ethyl group, an n-propyl group, an isopropyl group, an n-butyl group, an isobutyl group, a sec-butyl group, a t-butyl group, a pentyl group, a hexyl group, an octyl group, a decyl group, a tetradecyl group, a hexadecyl group, an octadecyl group, a cyclopentyl group, a cyclohexyl group, a cyclooctyl group, etc.

The ring of the cycloalkyl group may have a substituent selected from lower (C1 to C8) linear hydrocarbon groups (concretely including a methyl group, an ethyl group, an n-propyl group, an isopropyl group, an n-butyl group, an isobutyl group, a sec-butyl group, a t-butyl group, a pentyl group, a hexyl group, an octyl group).

The cycloaromatic hydrocarbon having from 7 to 20 carbon atoms in total includes, for example, a phenyl group and a naphthyl group, of which the aromatic ring has at least one substituent of a linear hydrocarbon group having from 1 to 10 carbon atoms, a branched hydrocarbon group having from 3 to 10 carbon atoms, or a cycloaliphatic hydrocarbon group having from 3 to 10 carbon atoms. Preferably, $R^1$ and $R^4$ each are a cycloaromatic hydrocarbon group having from 7 to 20 carbon atoms in total, especially preferably a 2,6-diisopropylphenyl group, a 2-t-butylphenyl group, a 2,6-dimethylphenyl group, or a 2,4,6-trimethylphenyl group. $R^1$ and $R^4$ may be the same or different.

Preferably, $R^2$ and $R^3$ each are a hydrogen atom or a hydrocarbon group having from 1 to 20 carbon atoms. More preferred for these is a linear hydrocarbon group having from 1 to 20 carbon atoms. Concretely, a methyl group is preferred.

X and Y each indicate a hydrogen atom, a halogen atom or a hydrocarbon group having from 1 to 20 carbon atoms. The hydrocarbon group having from 1 to 20 carbon atoms may be the same as that mentioned hereinabove. The halogen atom includes a chlorine atom, a bromine atom, a fluorine atom, and an iodine atom, and is preferably a chlorine atom. X and Y may be the same or different.

Z is a nitrogen-containing functional group. Preferably, it is represented by the following general formula (II):

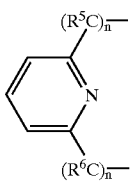

(II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

The aliphatic hydrocarbon group having from 1 to 20 carbon atoms and the cycloaromatic hydrocarbon group having from 7 to 20 carbon atoms in total for $R^5$ and $R^6$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. n indicates 0 or a natural number, but is preferably any of 0, 1, 2 or 3.

Specific examples of the nitrogen-containing functional groups of formula (II) are.

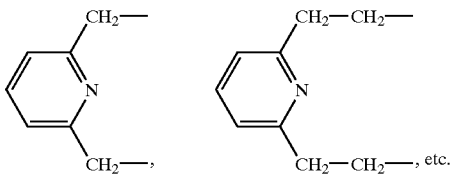

For Z, also preferred is a, nitrogen-containing functional group of the following general formula (III):

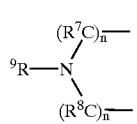

(III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

The aliphatic hydrocarbon group having from 1 to 20 carbon atoms and the cycloaromatic hydrocarbon group having from 7 to 20 carbon atoms in total for $R^7$, $R^8$ and $R^9$ may be the same as the hydrocarbon group having from 1 to 20 carbon atoms and the cycloaromatic hydrocarbon group having from 7 to 20 carbon atoms in total mentioned hereinabove for $R^1$, $R^2$, $R^3$ and $R^4$. $R^7$, $R^8$ and $R^9$ may be bonded to each other to form a ring. The ring is not specifically defined, including, for example, a cyclohexyl skeleton, a cyclopentyl skeleton, etc. n indicates 0 or a natural number, but is preferably any of 0, 1, 2 or 3.

Specific examples of the nitrogen-containing functional groups of formula (III) are

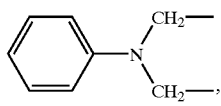

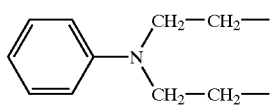 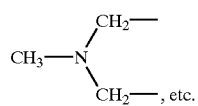, etc.

For Z, especially preferred is the nitrogen-containing functional group of formula (II) having a pyridine skeleton.

One preferred embodiment of the transition metal compound of formula (I) is represented by the following general formula:

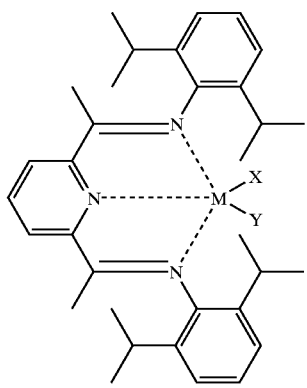

(IV)

wherein M represents Fe or Co; X and Y each independently present a hydrogen atom, or a hydrocarbon group having from 1 to 20 carbon atoms.

Specific examples of the transition metal compound of at type are the following compounds [3] to [15].

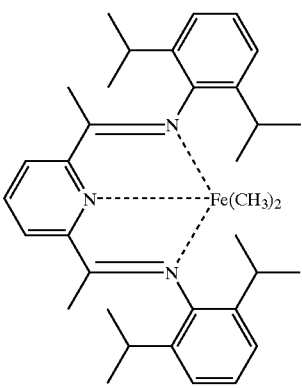

[3]

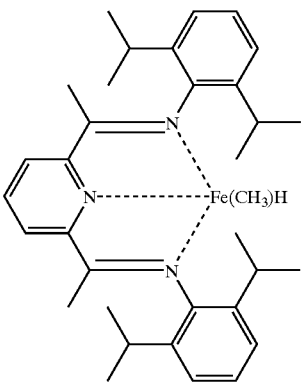

[4]

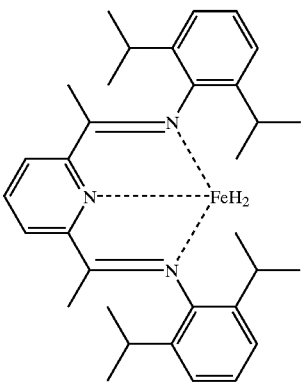

[5]

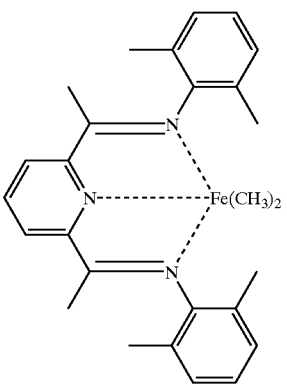

[6]

[7] 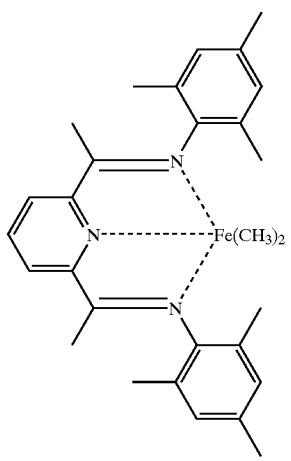
[8] 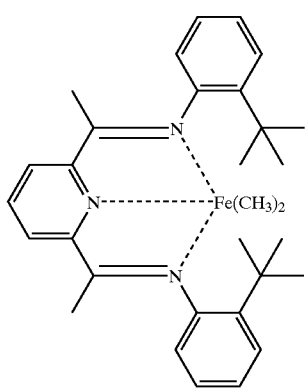
[9] 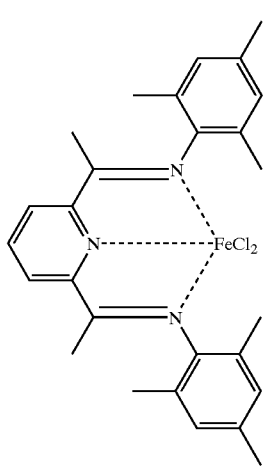
[10] 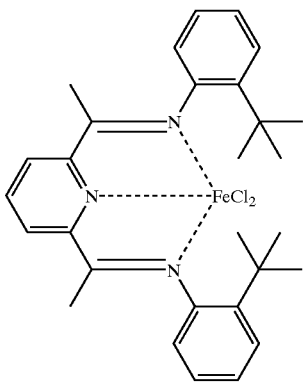
[11] 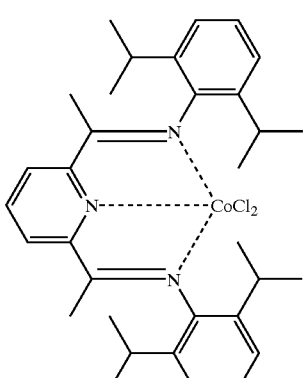
[12] 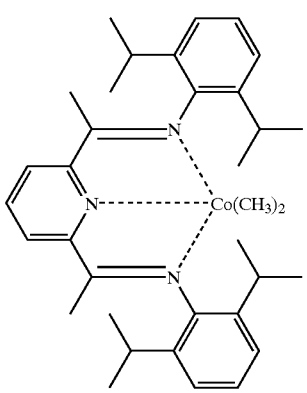
[13] 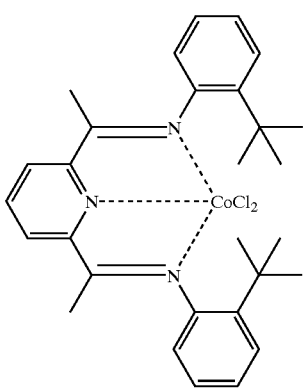

-continued

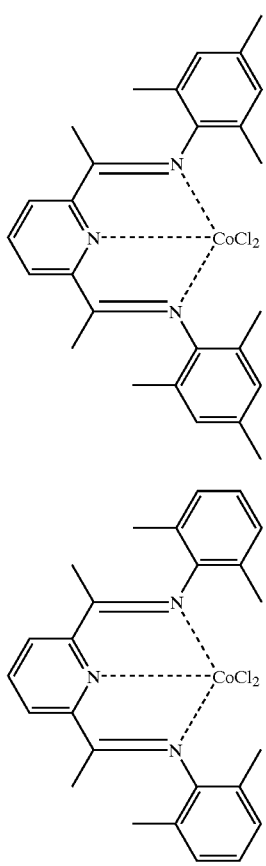

[14]

[15]

In the invention, one or more of: the transition metal compounds mentioned above may be used, either singly or as combined, for the component (A).

(2) Organoaluminium compound (B):

Organoaluminium compounds for the component (B) are described by the following general formula (IV):

$$R^{14}{}_p Al(OR^{15})_q L_{3-p-q} \quad (IV)$$

wherein $R^{14}$ and $R^{15}$ each represent a hydrogen atom, or a hydrocarbon group having from 1 to 20, preferably from 1 to 4 carbon atoms; L represents a halogen atom; p represents a real number of $0<p\leq 3$, and q represents a real number of $0\leq q<3$. Preferred is p=2 or 3 and q=0 or 1, most preferably p=3 and q=0.

Examples of the compounds are trialkylaluminiums such as trimethylaluminium, triethylaluminium, tripropylaluminium, triisobutylaluminium, tri-t-butylaluminium, etc.; halogen-, alkoxy- or hydroxyl-having alkylaluminiums such as dimethylaluminium chloride, diethylaluminium chloride, ehtylaluminiumsesquichloride, dimethylaluminium methoxide, diethylaluminium methoxide, dimethylaluminium hydroxide, diethylaluminium hydroxide, etc.; hydrogen-having alkylaluminiums such as dimethylaluminium hydride, diisobutylaluminium hydride, etc. Of those, preferred are trialkylaluminiums, and more preferred are trimethylaluminium and triisobutylaluminium. One or more of the organoaluminium compounds mentioned above may be used herein either singly or as combined.

The ratio of the components constituting the catalyst of the invention is not specifically defined. The blend ratio of the component (B) to mol of the transition metal in the component (A) may fall generally between 10 and 5000 mols, but preferably between 100 and 300 mols. If the blend ratios of the constituent components oversteps the defined ranges, the polymerization activity of the catalyst will be low.

[2] Method for producing olefin polymers:

The method for producing olefin polymers of the invention is characterized by homopolymerizing or copolymerizing olefins in the presence of the catalyst that comprises the component (A), a transition metal compound, the component (B), an organoaluminium compound.

In the method for producing polyolefins in the invention, favorably used is the catalyst noted above for homopolymerization of olefins or for copolymerization of olefins with other olefins and/or other monomers (that is, copolymerization of different types of olefins, or copolymerization of olefins with other monomers, or copolymerization of different types of olefins with other monomers).

Olefins to be polymerized in the invention are not specifically defined, but preferred are α-olefins having from 2 to 20 carbon atoms. α-olefins of that type include, for example, ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-hexene, 5-methyl-1-hexene, 3,3-dimethyl-1-pentene, 3,4-dimethyl-1-pentene, 4,4-dimethyl-1-pentene, vinylcyclohexane, etc. Other olefins include dienes such as 1,3-butadiene, 1,4-pentadiene, 1,5-hexadiene, etc.; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene, etc.; cyclic olefins such as cyclopentene, cyclohexene, norbornene, 5-methylnorbornene, 5-ethylnorbornene, 5-propylnorbornene, 5,6-dimethylnorbornene, 5-benzylnorbornene, etc. Styrenic compounds usable herein include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene, etc.; alkoxystyrenes such as p-methoxystyrene, o-methoxystyrene, m-methoxystyrene, etc.; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene, etc.; and also trimethylsilylstyrene, vinylbenzoates, divinylbenzene, etc. The other olefins to be copolymerized may be suitably selected from the olefins mentioned above.

In the invention, one or more olefins such as those mentioned above may be homopolymerized or copolymerized either singly or as combined. Where two or more different olefins are copolymerized, the olefins mentioned above may be combined in any desired manner.

In the invention, olefins such as those mentioned above may be copolymerized with any other comonomers. The comonomers include, for example, linear diolefins such as butadiene, isoprene, 1,4-pentadiene, 1,5-hexadiene, etc.; polycyclic olefins such as norbornene, 1,4,5,8-dimethano-1, 2,3,4,4a,5,8,8a-octahydronaphthalene, 2-norbornene, etc.; cyclic diolefins such as norbornadiene, 5-ethylidenenorbornene, 5-vinylnorbornene, dicyclopentadiene, etc.; and unsaturated esters such as ethyl acrylate, methyl methacrylate, etc.

Of olefins such as those mentioned above, ethylene is especially preferred in the invention. The method for polymerizing olefins is not specifically defined and may be any ordinary one including, for example, slurry polymerization, solution polymerization, vapor-phase polymerization, bulk polymerization, suspension polymerization, etc.

A polymerization solvent may be used in the invention. It includes hydrocarbons and halogenohydrocarbons such as benzene, toluene, xylene, n-hexane, n-heptane, cyclohexane, methylene chloride, chloroform, 1,2-dichloroethane, chlorobenzene, etc. One or more of such solvents are usable either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (A) could fall generally between 0.5 and 100 μmols, but preferably between 2 and 25 μmols, in one liter of the solvent in the system.

Regarding the polymerization condition, the pressure may fall generally between ordinary pressure and 2000 kg/cm$^2$G, preferably between 5 and 10 kg/cm$^2$G. The reaction temperature may fall generally between −50 and 250° C., preferably between 0 and 80° C. For controlling the molecular weight of the polymers to be produced, the type and the amount of the catalytic components to be used and the polymerization temperature will be suitably selected. If desired, hydrogen may be introduced into the polymerization system for that purpose.

The invention is described in more detail with reference to the following Examples, which, however, are not intended to restrict the scope of the invention.

EXAMPLE 1

An autoclave having a capacity of 1.6 liters was fully dried and then purged with nitrogen. 400 ml of toluene having been dewatered at room temperature, 1 mmol of trimethylaluminium, and 5 μmols of the compound [3] mentioned above (this is a compound of a transition metal of Groups 8 to 10 of the Periodic Table, having a nitrogen-containing tridentate ligand) were put into the autoclave in that order. Ethylene was continuously introduced into the autoclave at 25° C. to have a pressure of 8 kg/cm$^2$G therein, and polymerized for 30 minutes. Next, methanol was added to this to stop the polymerization. The polymer thus produced was taken out through filtration, and dried at 90° C. under reduced pressure for 12 hours. The polymer thus obtained weighed 63.0 g. The polymerization activity of the catalyst used herein was 429 kg/g-Fe·hr. The polymerization activity of aluminium used herein was 4.67 kg/g-Al·hr.

The polymer had an intrinsic viscosity [η] of 4.66 dl/g measured in decalin at 135° C., and had a density of 0.9368 g/cm$^3$.

EXAMPLE 2

This is the same as in Example 1, except that triisobutylaluminium and not trimethylaluminium was used herein. The polymer obtained weighed 56.1 g. The polymerization activity of the catalyst used herein was 383 kg/g-Fe·hr. The polymerization activity of aluminium used herein was 4.15 kg/g-Al·hr.

The polymer had an intrinsic viscosity [η] of 2.36 dl/g measured in decalin at 135° C., and had a density of 0.9353 g/cm$^3$

COMPARATIVE EXAMPLE 1

This is the same as in Example 1, except that 1 mmol of methylaluminoxane and not trimethylaluminium was used herein. The polymer obtained weighed 54.1 g. The polymerization activity of the catalyst used herein was 369 kg/g-Fe·hr. The polymerization activity of aluminium used herein was 4.01 kg/g-Al hr.

The polymer had an intrinsic viscosity [η] of 3.6 dl/g, and had a density of 0.9303 g/cm$^3$.

INDUSTRIAL APPLICABILITY

Comprising a transition metal compound which has a nitrogen-containing tridentate ligand and of which the transition metal is of Groups 8 to 10 of the Periodic Table, and an organoaluminium compound, the catalyst of the invention has high activity. In the method of using the catalyst for producing polyolefins, of which the advantages are that the catalysts do not require methylaluminoxane which is expensive and difficult to handle, and of which storage stability is poor, and is extremely dangerous. The invention realizes efficient production of polyolefins (especially polyethylene) on an industrial scale.

What is claimed is:

1. A catalyst for olefin polymerization, comprising (A) a transition metal compound which has a nitrogen-containing tridentate ligand and of which the transition metal is of Groups 8 to 10 of the Periodic Table, (B) an organoaluminium compound, wherein the transition metal compound (A) is represented by the following general formula (I):

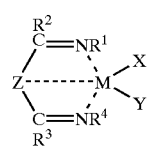

(I)

wherein M represents a transition metal of Groups 8 to 10 of the Periodic Table; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, a halogen atom, or a hydrocarbon group having from 1 to 20 carbon atoms; and Z represents a nitrogen-containing functional group represented by the following general formula (III):

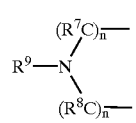

(III)

wherein $R^7$, $R^8$ and $R^9$ each independently represent an aliphatic hydrocarbon group having from 1 to 20 carbon atoms, or a cycloaromatic hydrocarbon group having from 7 to 20 carbon atoms in total, and these may be bonded to each other to form a ring; n represents 0 or a natural number.

2. The catalyst according to claim 1, wherein the transition metal of Groups 8 to 10 of the Periodic Table is iron or cobalt.

3. The catalyst according to claim 1, wherein the organoaluminium compound (B) is a trialkylaluminum compound.

4. A method for producing olefin polymers, which comprises polymerizing olefins in the presence of the catalyst as claimed in claim 1.

5. The method according to claim 4, wherein the olefin is ethylene.

6. A catalyst for olefin polymerization, comprising (A) a transition metal compound which has a nitrogen-containing tridentate ligand, and (B) a trialkylaluminum compound, wherein the transition metal compound (A) is represented by the following general formula (I):

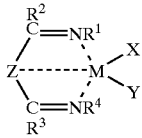

(I)

wherein M represents iron or cobalt; $R^1$, $R^2$, $R^3$ and $R^4$ each independently represent a hydrogen atom, a hydrocarbon group having from 1 to 20 carbon atoms, or a cycloaromatic hydrocarbon group having from 7 to 20 carbon atoms in total; X and Y each independently represent a hydrogen atom, a halogen atom, or a hydrocarbon group having from 1 to 20 carbon atoms; and Z represents a nitrogen-containing functional group represented by the following general formula (II):

(II)

wherein $R^5$ and $R^6$ each independently represent an aliphatic hydrocarbon group having from 1 to 20 carbon atoms, or a cycloaromatic hydrocarbon group having from 7 to 20 carbon atoms in total; n represents 0 or a natural number.

7. A method for producing olefin polymers, which comprises polymerizing olefins in the presence of the catalyst as claimed in claim 6.

8. The method according to claim 7, wherein the olefin is ethylene.

\* \* \* \* \*